(No Model.) 2 Sheets—Sheet 1.
P. F. SMITH & A. G. W. FOSTER.
Combined Implement for Agricultural Purposes.
No. 240,617. Patented April 26, 1881.
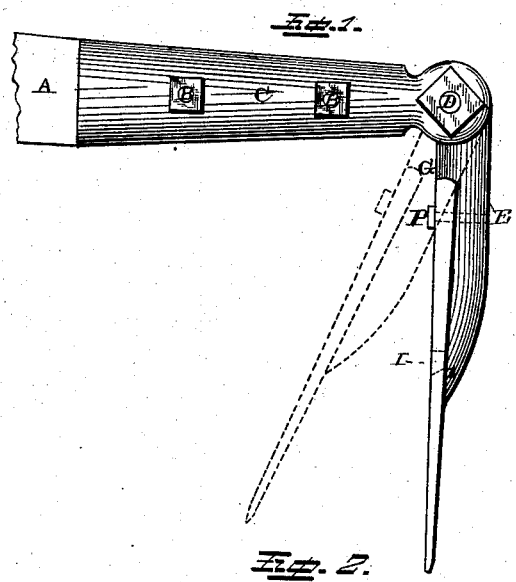
Fig. 1.
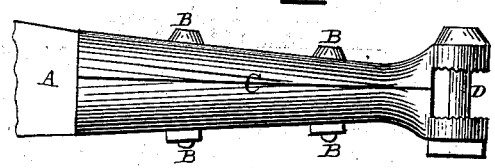
Fig. 2.
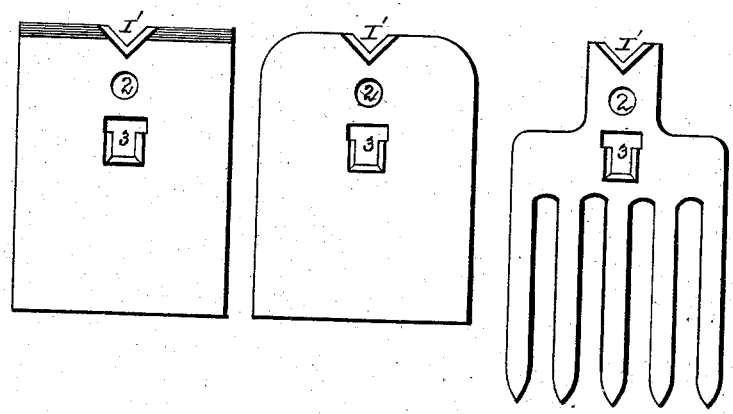
Fig. 3.
Witnesses. 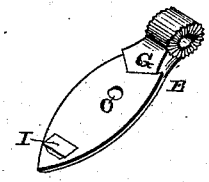 Inventor (No Model.) 2 Sheets—Sheet 2.
P. F. SMITH & A. G. W. FOSTER.
Combined Implement for Agricultural Purposes.
No. 240,617. Patented April 26, 1881.
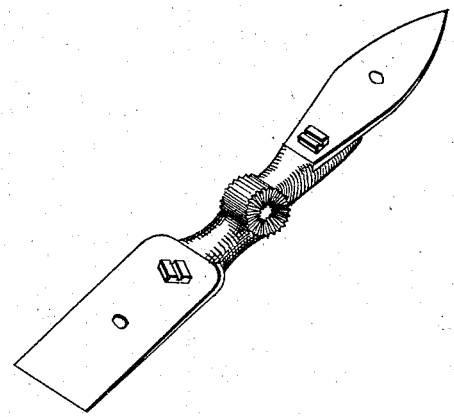
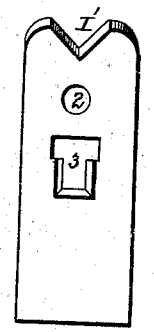 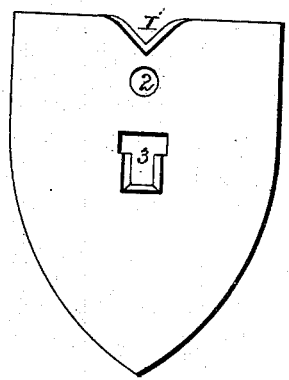 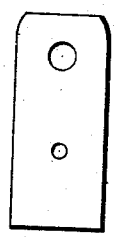
Witnesses. Inventors.

UNITED STATES PATENT OFFICE.

PETER F. SMITH AND ABRAHAM G. W. FOSTER, OF NEWNAN, GEORGIA, ASSIGNORS OF ONE-THIRD TO N. B. GLOVER, OF SAME PLACE.

COMBINED IMPLEMENT FOR AGRICULTURAL PURPOSES.

SPECIFICATION forming part of Letters Patent No. 240,617, dated April 26, 1881.

Application filed January 19, 1881. (No model.)

*To all whom it may concern:*

Be it known that we, P. F. SMITH and ABRAHAM G. W. FOSTER, of Newnan, in the county of Coweta and State of Georgia, have invented certain new and useful Improvements in Combined Implement for Agricultural Purposes; and we do hereby declare the following to be a full, clear, and exact description of the invention, such as will enable others skilled in the art to which it pertains to make and use it, reference being had to the accompanying drawings, which form part of this specification.

Our invention relates to an improvement in combined implements for agricultural uses; and it consists in the combination of a handle provided with a suitable ratchet-clamp, a shank which can be applied to any of the tools, and which is provided with a dovetailed projection, and suitable tools which have a slot made through each one to catch over the dovetailed projection, as will be more fully described hereinafter.

The object of our invention has been to provide a combined implement for agricultural purposes, consisting of a single handle and any desired number of tools, all of which can be applied to the same handle, and thus provide a large number of separate tools at a very great reduction in price, and which will take up but very little more room than a single one.

Figure 1 is a side elevation of a tool embodying our invention, and showing the blade in different positions. Fig. 2 is a plan view of the end of the handle. Figs. 3 and 4 are detail views of different forms of tools to be applied to the handle.

A represents a common handle of any kind, and which has secured to its lower end, by means of the two bolts B, the clamp C. This clamp is made in two parts, so as to be readily opened outward by loosening the nuts on the bolts, for the purpose of putting on and taking off the tools. Through the outer ends of these two parts of the clamp is passed the bolt D, which has a square head, so as to prevent it from turning around, and the inner side of the end of each part of the clamp is provided with ratchets, so as to engage with the ratchets formed on each side of the upper end of the shank E. This shank has a hole through its upper end for the clamping-bolt to pass through, and when once placed upon the bolt, in between the two ends of the clamp it can be adjusted into any desired position. This shank has the shoulder G formed upon its inner side for the purpose of catching in the upper edge of the tools which are to be used upon the implement for the purpose of holding them more rigidly in position. Upon the same side of the shank, near its lower end, is a dovetailed projection, I, which is intended to pass through the slot made in each one of the implements that is to be attached to the handle for the purpose of holding them in place. In between the projection and the shoulder is made a screw-hole, O, for the purpose of receiving the inner end of the screw P, which is passed through the tool into the shank for the purpose of preventing the tool from moving.

There may be attached to the handle and shank above described a hoe, spade, fork, shovel, or any other implement used for agricultural purposes in connection with a handle, and each one of them will have a notch, I', cut in its upper edge, to catch under the shoulder on the upper end of the shank, a screw-hole, 2, for the screw P to pass through, and a slot, 3, which is larger at the upper than the lower end. Through the upper end of the slot the projection on the shank is passed, and then the implement is moved lengthwise so as to catch under the sides of the projection. After the tool has been moved the full length of this slot the screw-hole is brought just over the screw-hole in the shank, when the screw is screwed in position, and the tool is firmly secured in position by means of the projection, screw, and shoulder.

Should it be desired to change the angle at which the tool is to be used at any time, it is only necessary to loosen the clamping-bolt which passes through the lower end of the clamp and the two screws which secure the clamp to the handle, and then the clamp can be opened sufficiently far to change the angle to any desired degree.

We are aware that it is not new to secure a hoe or rake to a shank by means of a simple slot, clamping-bolt, and a projection on the shank to catch over the top of the tool, for these features are shown in Patent No. 110,126, granted December 13, 1870. Our invention differs from this in having a shank which is adjustable in its holding-clasp, and which is provided with a dovetailed projection, I, to catch in a slot of peculiar shape, a screw-hole to receive a clamping-bolt, and a projection to catch over the top of the blade.

In case a pick is desired the shank will be made of double length and have its screw-hole and ratchet formed in its center, and then tools of different shape or kind can be fastened to the double shank, either by means of the devices already described or any other which may be preferred.

By means of the above-described construction it will readily be seen that it will be necessary to buy but a single handle with a set of the tools which are necessary, and thus the expense of a handle for each separate tool is avoided, besides being able to pack the whole set of tools in a very small compass.

Having thus described our invention, we claim—

In an agricultural implement, the combination of the handle A, the clamp C, secured in position by means of the bolts B, and having ratchet-teeth formed in its outer end, with the bolt D, shank E, having dovetailed projection I, screw-hole O, and projection G, a tool having the slot 3, hole 2, and notch I', and the bolt P, the parts being constructed and arranged to operate substantially as shown and described.

In testimony that we claim the foregoing we have hereunto set our hands this 4th day of December, 1880.

PETER FRANCISCO SMITH.
  ABRAHAM G. W. FOSTER.

Witnesses:
  WILLIAM H. DAVIS,
  TOLLESON KIRBY.